United States Patent [19]
Learmont et al.

[11] 3,944,300
[45] Mar. 16, 1976

[54] RESILIENT GUIDE BUSHING MOUNTING FOR BLAST HOLE DRILLS OR THE LIKE

[75] Inventors: Tom Learmont, Wauwatosa; Jack D. Nelmark, New Berlin; Gary E. Martin, South Milwaukee; Theodore F. Raske, Germantown, all of Wis.

[73] Assignee: Bucyrus-Erie Company, South Milwaukee, Wis.

[22] Filed: Feb. 26, 1975

[21] Appl. No.: 553,441

[52] U.S. Cl. .................. 308/4 R; 173/164; 175/220
[51] Int. Cl.² ............................................. F16C 1/26
[58] Field of Search ............. 308/4 R, 4 A, 3 R, 58, 308/63, 72, 73, 237 R, DIG. 4; 173/164; 175/220; 166/241

[56] References Cited
UNITED STATES PATENTS

| | | | |
|---|---|---|---|
| 2,386,281 | 10/1945 | Watson | 308/4 R |
| 3,194,611 | 7/1965 | Mahony | 308/4 R |
| 3,833,070 | 9/1974 | Anderson | 308/4 R X |

*Primary Examiner*—M. H. Wood, Jr.
*Assistant Examiner*—Gene A. Church
*Attorney, Agent, or Firm*—Quarles & Brady

[57] ABSTRACT

The guide bushing of a blast hole drill is resiliently mounted to dampen lateral vibrations of the drill string. The mounting arrangement comprises four pads symmetrically placed about the bushing and restrained against all but radial movement. Each pad includes a radially inner bearing section that bears against the exterior of the bushing, an outer backing section that is radially movable with respect to the bearing section, and a resilient cushion between the two sections. A four-lobed cam ring surrounds and faces the backing sections and is rotated to simultaneously load all the cushions to a selected degree. In the preferred embodiment, the mounting components are in an enclosed housing that defines guide channels for the pad and that can easily be fitted into the deck of a machine.

9 Claims, 15 Drawing Figures

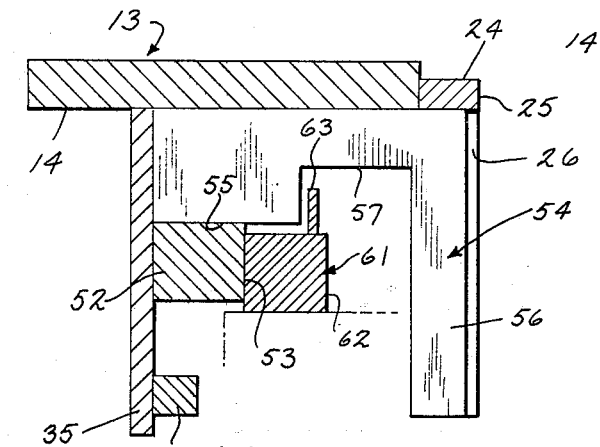
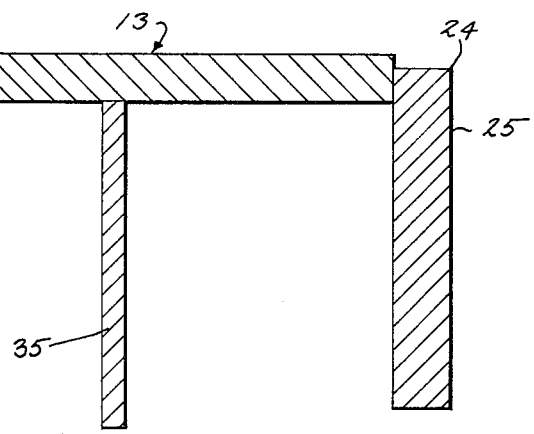
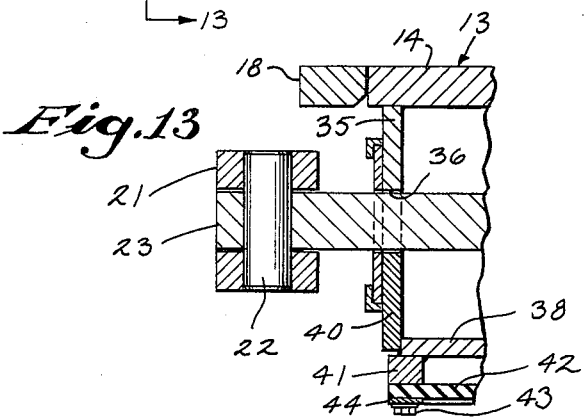

RESILIENT GUIDE BUSHING MOUNTING FOR BLAST HOLE DRILLS OR THE LIKE

BACKGROUND OF THE INVENTION

The drill string of a conventional blast hole drill extends downwardly through an opening in the deck of a machine, and there is a tubular cylindrical bushing mounted on the deck through which the drill string passes with a relatively close fit, the bushing serving to guide the drill string and also provide a bearing and wear surface. Suck deck bushings have heretofore generally been rigidly mounted with respect to the deck, as the result of which lateral vibrations emanating from the drill string are transmitted directly to the machine.

Very substantial lateral vibrations can occur in a drill string, for example when the bit encounters hard rocks or other irregularities. As the drill string becomes longer, there can be very significant column bending of the string, and this can result in additional or magnified vibrations. Also, resonant conditions can occur at certain lengths and/or rotational speeds, again resulting in added or magnified lateral vibration. Where the bushing is rigid with respect to the deck, lateral vibrations are transmitted directly to the machine and serious structural damage can result; there are many instances where vibrations have resulted in broken welds and other structural damage to the machine. Further, undampened vibrations cause excessive wear of the drill string sections and bits, or result in wear or damage to the rotary driving head.

Considerable effort has been devoted to analyzing and overcoming the problem of lateral vibration, but no known solution is fully effective. There are, for example, guide bushings provided with rubber rings or collars bonded to their exterior surfaces. These may successfully damp vibrations, but only for a very short time since they simply do not have the requisite mechanical strength. A particular problem in this regard is that the drill string also exerts rotational and vertical forces on the bushing, and these, with the lateral movements, result in a grinding action which can destroy the rubber backing in a matter of minutes. Making the rubber harder may increase its life, but it also reduces its effectiveness in damping vibration. Further, the resilience of bushings of the noted type cannot be adjusted to meet varying conditions.

SUMMARY OF THE INVENTION

This invention solves the problem of lateral vibration by providing an improved resilient mounting arrangement for the guide bushing. The mounting arrangement makes use of compressible rubber or other cushions, but includes various features to provide a high degree of mechanical strength and resulting long life. For one thing, there are metal bearing members interposed between the cushions and the bushing, and metal backing members radially behind the cushions. The bearing and backing members are held against all but radial movement with respect to the bushing and with respect to one another, to provide improved operation and to effectively eliminate any grinding action on the cushions.

The invention also contemplates adjustment means to apply a selected resilient preload; a high preload may be desirable in some cases, whereas little or no preload may be desired in other situations. In the preferred embodiment, there are a number of resilient pad assemblies spaced around the bushing, and a single cam ring is used to simultaneously adjust the preload on all of them.

In the preferred embodiment, the mounting elements are in an enclosed housing that defines guide channels for the pads and that can easily be designed to fit into the deck of an existing machine.

The invention provides, in general, a highly effective resilient mounting arrangement that has enough mechanical strength even for very large machines, but that is still relatively simple and inexpensive to manufacture, assemble, install and maintain. While designed particularly for blast hole drills, the invention would be useful for other drilling machines.

Other features, objects and advantages will appear from the description to follow.

BRIEF DESCRIPTION OF THE DRAWINGS

FIG. 10 is a fragmentary view in cross section through the plane 10—10 shown in FIG. 9, FIG. 11 is a fragmentary view in cross section through the plane 11—11 shown in FIG. 8, FIG. 12 is a view in cross section, with parts broken away, through the plane 12—12 shown in FIG. 14, the drill string being shown in place in this view.

FIG. 13 is a fragmentary view in cross section through the plane 13—13 shown in FIG. 2.

DESCRIPTION OF THE PREFERRED EMBODIMENT

Figure 1:
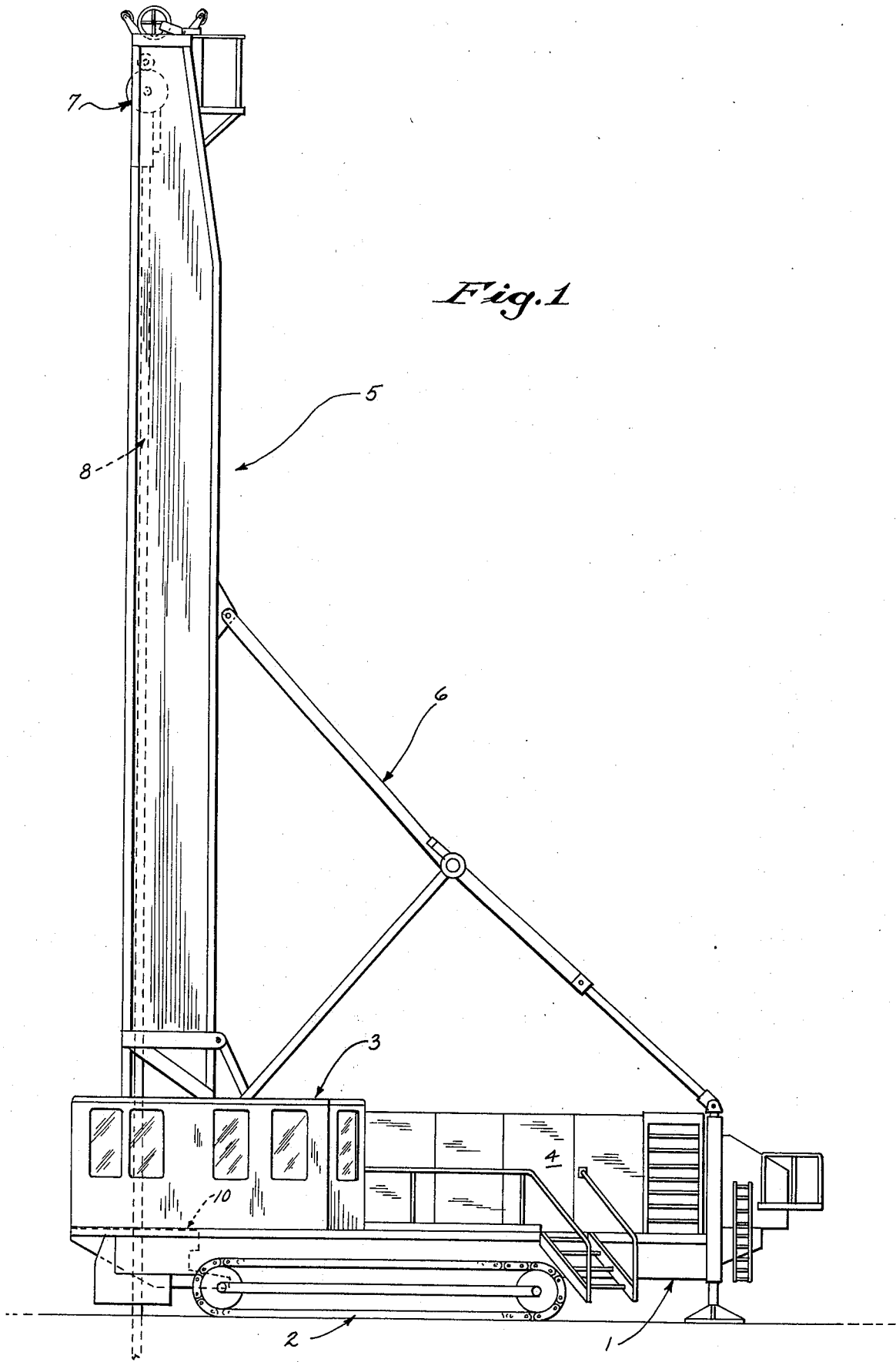
FIG. 1 is a somewhat schematic side view in elevation showing a blast hole drill incorporating a guide bushing mounting according to the invention.

The blast hole drill shown in FIG. 1 is generally conventional and includes a machinery platform designated by the reference numeral 1, and that is supported on crawlers 2. An operator's cab 3 is located at the left side of the machinery platform 1 as seen in FIG. 1, and a machinery housing 4 is at the right side. A mast 5 is also supported at the left end of the platform 1 and is held in vertical position by link means 6, the mast being pivotal in usual fashion in a clockwise direction as seen in FIG. 1. A rotary driving head 7 is mounted on the mast 5 and serves to rotate the drill string. The head 7 travels up and down the mast in usual fashion to raise and lower the drill string. A drill string 8, made up of sections of drill pipe threadedly connected together, extends downwardly from the head 7 through the deck of the platfrom 1 and into the ground. Since the construction and operation of such machines are well known to those skilled in the art, and since the machine as such does not form a part of the invention herein, the machine has not been shown and will not be described in greater detail. As indicated above, the guide bushing mounting of this invention is useful with other types of blast hole drills, and other drilling machines.

Figure 2:
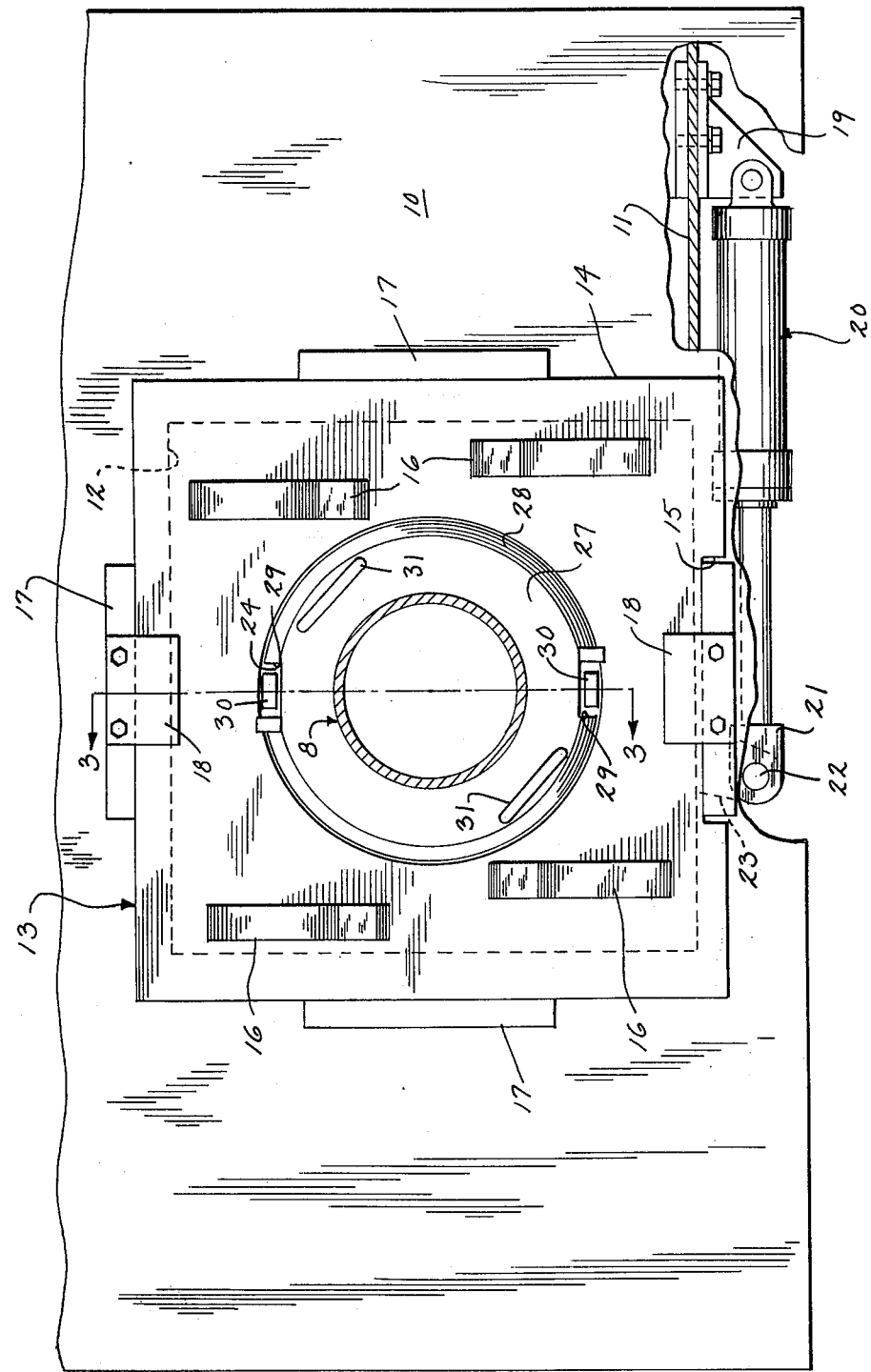
FIG. 2 is a fragmentary top plan view, partially broken away, of a portion of the deck of the machine of FIG. 1 showing the guide bushing and its mounting housing with the drill string extending therethrough.
Figure 3:
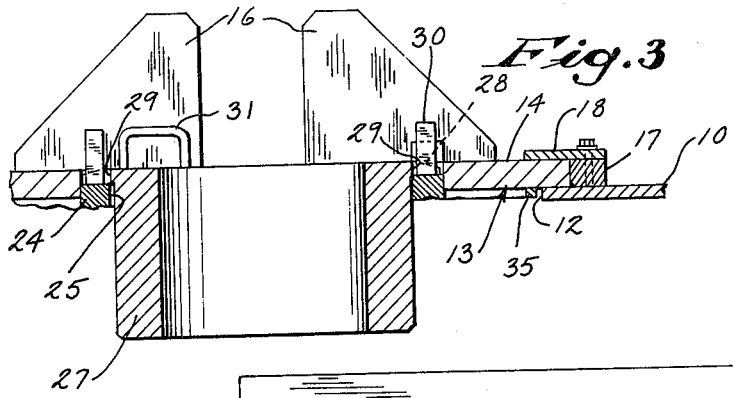
FIG. 3 is a fragmentary view in cross section through the plane 3—3 shown in FIG. 2, but with the drill string omitted for the sake of clarity and simplicity.

Referring now to FIG. 2, the reference numeral 10 indicates a portion of the deck of the drilling machine that, in conventional fashion, comprises a solid horizontal metal cover plate with suitable vertical stiffeners or supports, one of which is seen at 11; the deck section 10 is at the foot of the mast 5 and in the particular machine illustrated it is actually attached to and pivotable with the mast. In the preferred embodiment, the deck 10 is provided with a square cutout portion 12 that receives a guide bushing housing indicated generally by the reference numeral 13. Forming the guide bushing housing 13 as a separate element received in an opening in the deck is particularly advantageous in that it allows for easy incorporation of the mounting arrangement of the invention into a variety of machines. It is not, however, imperative; the deck may be constructed in any suitable fashion, and the elements of the guide bushing mounting arrangement may be built into the deck or otherwise mounted thereon.

The guide bushing housing 13 includes a square, heavy metal top plate 14 that is larger than the cutout 12 and rests on the deck 10 about substantially the entire periphery of the opening 12; there is a small cutout portion at the bottom as seen in FIG. 2, but this is provided only to give clearance for other elements (not shown) of the particular machine for which this embodiment of the invention was designed. Welded to the top of the plate 14 are four upstanding lugs 16, and these are used in conventional fashion with hydraulic jack clamps (not shown) which extend between the lugs 16 from opposite sides to clamp the drill string 8 for the purpose of making and breaking threaded connections between the sections. Four chock bars 17 are welded or otherwise secured to the top surface of the deck 10 adjacent the four sides of the plate 14. Clamping plates 18 are bolted to the upper and lower chock bars 17 as seen in FIG. 2 and extend over the top of the plate 14 to hold the housing 13 down against the deck 10. Similar plates could be provided for the side chock bars 17, but in the preferred embodiment the clamping jacks (not shown) for the drill string 8 extend across these and bear against the top of the plate 14 to assist in holding the housing 13 against the deck 10. A bracket 19 is bolted to the vertical deck stiffener 11 and mounts the casing end of a double acting hydraulic actuating cylinder 20. A bifurcated fitting 21 is fixed to the outer end of the rod of the cylinder 20 and is connected by means of a pin 22 to an outwardly extending arm 23 of a cam ring which will be described. The cylinder 20 is shown in the drawings in a fully extended position, which means that the arm 23 has been moved to the left as seen in FIG. 2 toward what is an actuated position. Retraction of the rod will cause the arm 23 to move to the right toward a retracted position. The operating circuit for the cylinder is not shown, but any of many known arrangements can be used to allow selective powered extension and retraction of the rod.

A tubular cylindrical metal sleeve 24 has its upper edge welded in a central opening in the plate 14 and extends downwardly as seen in FIG. 11 to define a cylindrical opening 25 that is essentially a deck opening. The sleeve 24 is essentially continuous and extends to the bottom of the housing 13 except that on its bottom edge it is provided with four generally square cutouts 26 which are disposed symmetrically about its circumference and through which pad assemblies to be described extend. A generally conventional tubular, rigid, cylindrical guide bushing 27 is received in the sleeve 24 with substantial lateral clearance, and has at its upper end a radially extending flange 28 that overhangs and rest on the upper edge of the sleeve 24, the top of the sleeve 24 being slightly recessed with respect to the plate 14 so that the top of the bushing 27 is essentially flush. In the preferred embodiment of the invention, the bushing 27 is not intended to rotate substantially. To prevent rotation, the flange 28 is provided with diametrically opposite cutouts 29, and received in these are upstanding lugs 30 which are welded to the top plate 14, the lugs being substantially smaller than the cutouts to allow limited rotational movement. A second pair of stop lugs 31 are welded to the top surface of the flange 28 to be engageable with respective lugs 30; it will be understood that the bushing 27 will tend to rotate only in one direction while the drill string 8 is drilling down, so that it is only necessary that there be two lugs 31 on corresponding sides of respective lugs 30. Opposite handles 32 are provided on the upper surface of the bushing 27 so that it can be manually inserted and removed.

The drill string 8 extends through the bushing 27 with a relatively close fit, and the bushing 27 provides a guide and bearing surface as the drill string 8 rotates and moves axially therethrough. Having a bushing similar to the bushing 27 that is disposed in a sleeve is in itself conventional. In most cases, however, the bushing is rigidly mounted with respect to the deck, as the result of which lateral vibrations emanating from the drill string 8 are transferred directly to the machine.

Figure 6:
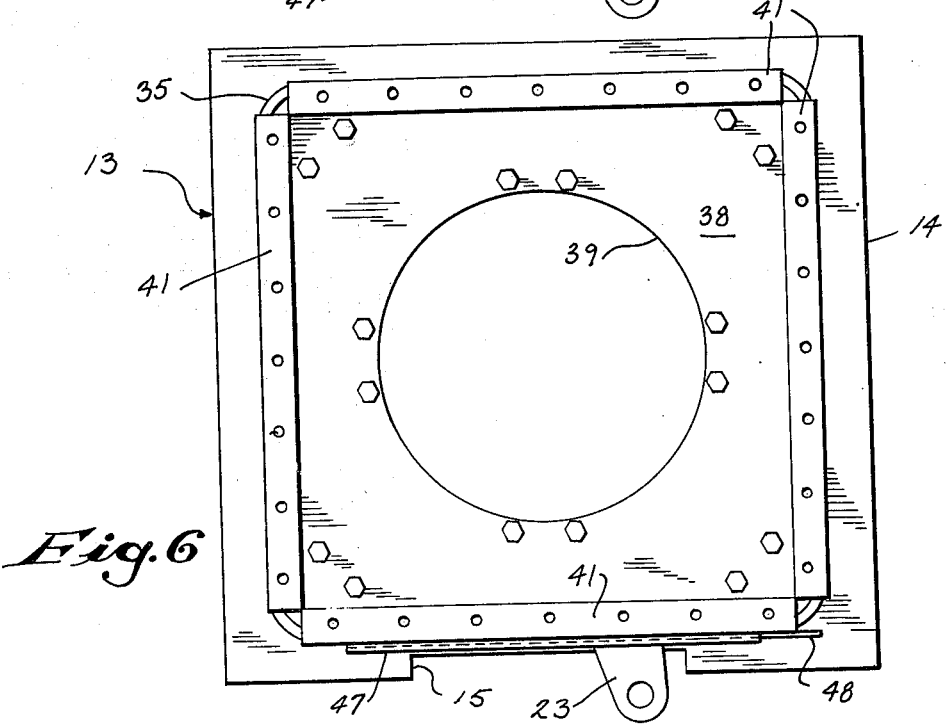
FIG. 6 is a bottom plan view similar to FIG. 4, but with a dust shield removed.
Figure 7:
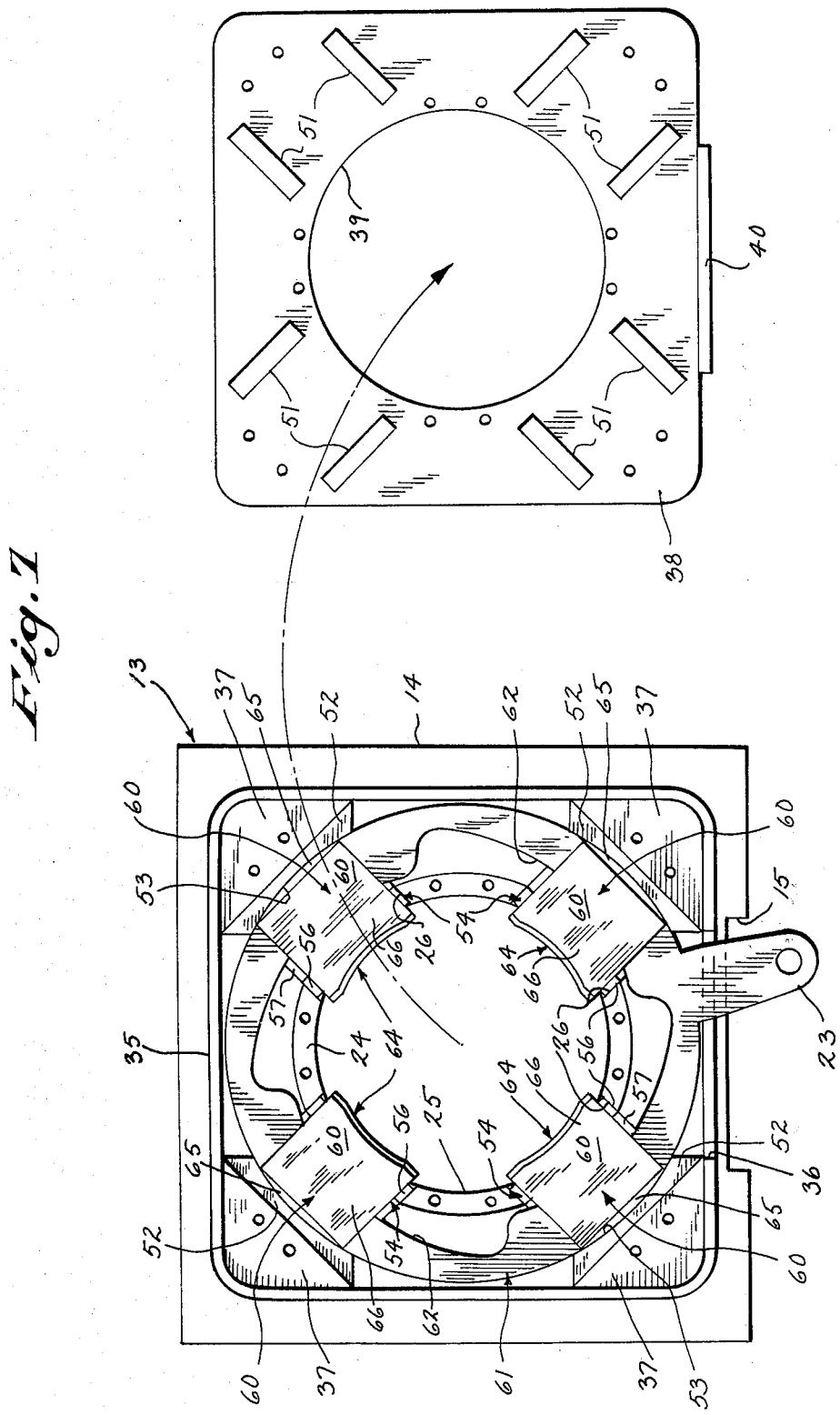
FIG. 7 is a bottom plan view similar to FIG. 6, but showing a cover plate removed and turned upside down to illustrate its construction.
Figure 8:
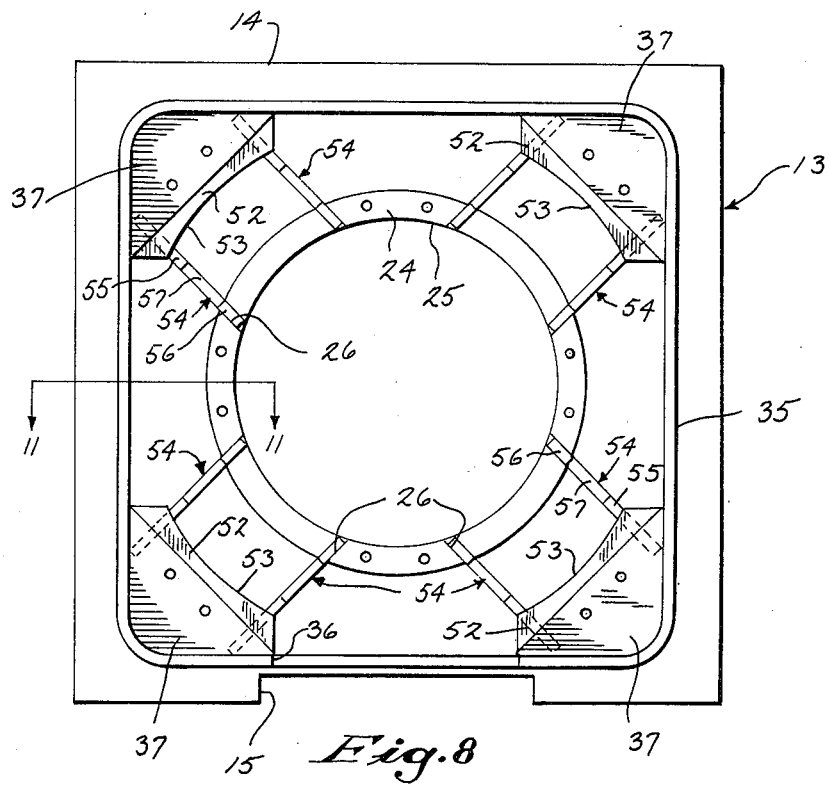
FIG. 8 is a bottom plan view similar to FIG. 7, but in which pads and a cam ring have been removed.

As can be seen most clearly in FIGS. 7 and 12, the housing 13 also includes a side wall 35 that has its upper edge welded to the underside of the plate 14 and that defines a substantially square enclosure with rounded corners. The side wall 35, although it may be made of several pieces of metal, is substantially continuous except for a cutout 36 on one side through which the arm 23 extends. Triangular support plates 37 are welded to the corners of the side wall 35 slightly above its bottom edge so that their bottom surfaces are on the same plane as the bottom edge of those portions of the sleeve 24 which are not cut out, and these full portions of the sleeve 24 and the plates 37 together serve as a support for a metal bottom plate 38 that rests within the perimeter of the wall 35 and is provided with a central circular opening 39 that is aligned and mates with the opening 25. The plate 38 is bolted to the support plates 37 and sleeve 24 as seen in FIG. 6, to form an essentially complete enclosure except for the central opening 25 that receives the bushing 27. A rectangular closure plate 40 is fixed centrally of one edge of the plate 38, and this is received in the side wall cutout 36 as seen in FIG. 12 to define an elongated, horizontally disposed slot through which the arm 23 extends.

Figure 5:
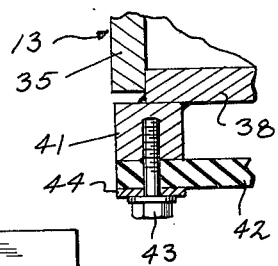
FIG. 5 is a fragmentary view in cross section through the plane 5—5 shown in FIG. 4.
Figure 4:
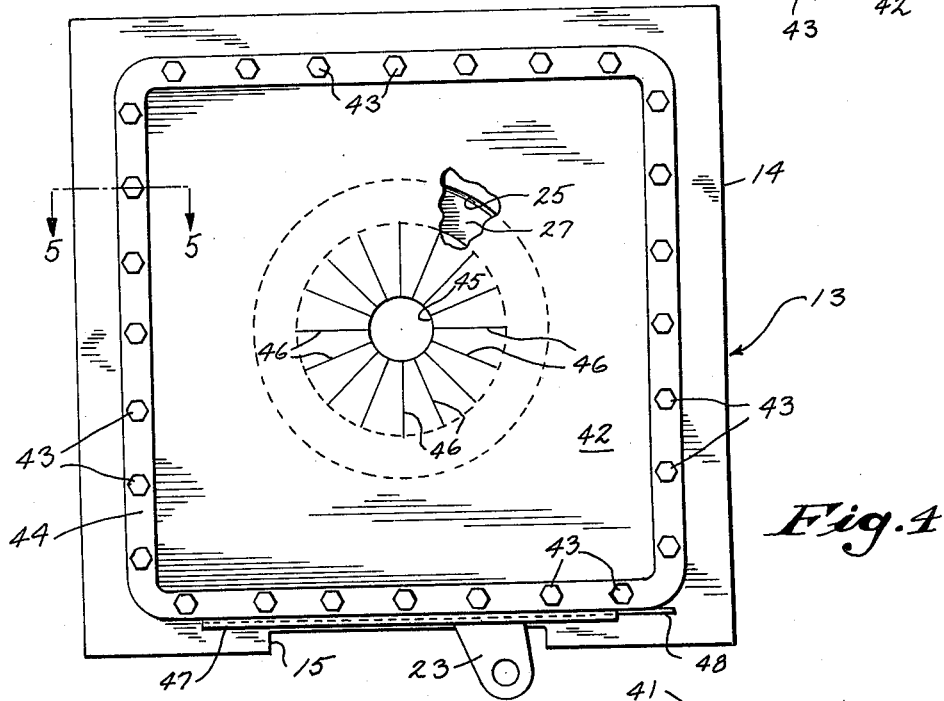
FIG. 4 is a bottom plan view, partially broken away, of the housing for the mounting arrangement, with the deck, appurtenant elements and drill string omitted for the sake of clarity and simplicity.

As can be seen in FIGS. 4–6 four metal bars 41 are welded or otherwise affixed to the underside of the plate 38 and overhang the bottom edge of the side wall 35. These serve as a support for a dust protector 42 in the form of a thick, square sheet of reinforced rubber or other suitable material, the edges of which are secured to the bars 41 by means of bolts 43 that are threadedly received in tapped holes in the bars. A metal reinforcement strip 44 is provided about the entire perimeter of the sheet 42. The sheet 42 has a central opening 45 that is substantially smaller than the opening 25, and slits 46 radiate outwardly from the opening 45 to approximately the perimeter of the opening 25. FIG. 4 shows the sheet 42 as it appears when there is no drill string extending through the housing 13, and it will be understood that the drill string 8 will deflect the leaves formed by the slits 46 as it passes through the sheet 42, as illustrated in FIG. 12.

As can be seen in FIGS. 12 and 13, facing, parallel angle members 47 are fixed to the exterior of the side wall 35 above and below the slot in which the arm 23 moves, and these define a track in which there is slidably received a dust protecting member 48 in the form of a rectangular sheet of metal or any other suitable material. The arm 23 extends outwardly through an opening 49 in the member 48, and as the arm moves from left to right the member 48 slides with it in the track formed by the angle members 47, the opening 49 being large enough to accommodate resulting relative movement between the arm 23 and sheet 48. The length of the member 48 is such that the slot through the side wall 35 is covered regardless of the position of the arm 23, thus preventing the entry of dirt or dust into the interior of the housing 13.

Figure 14:
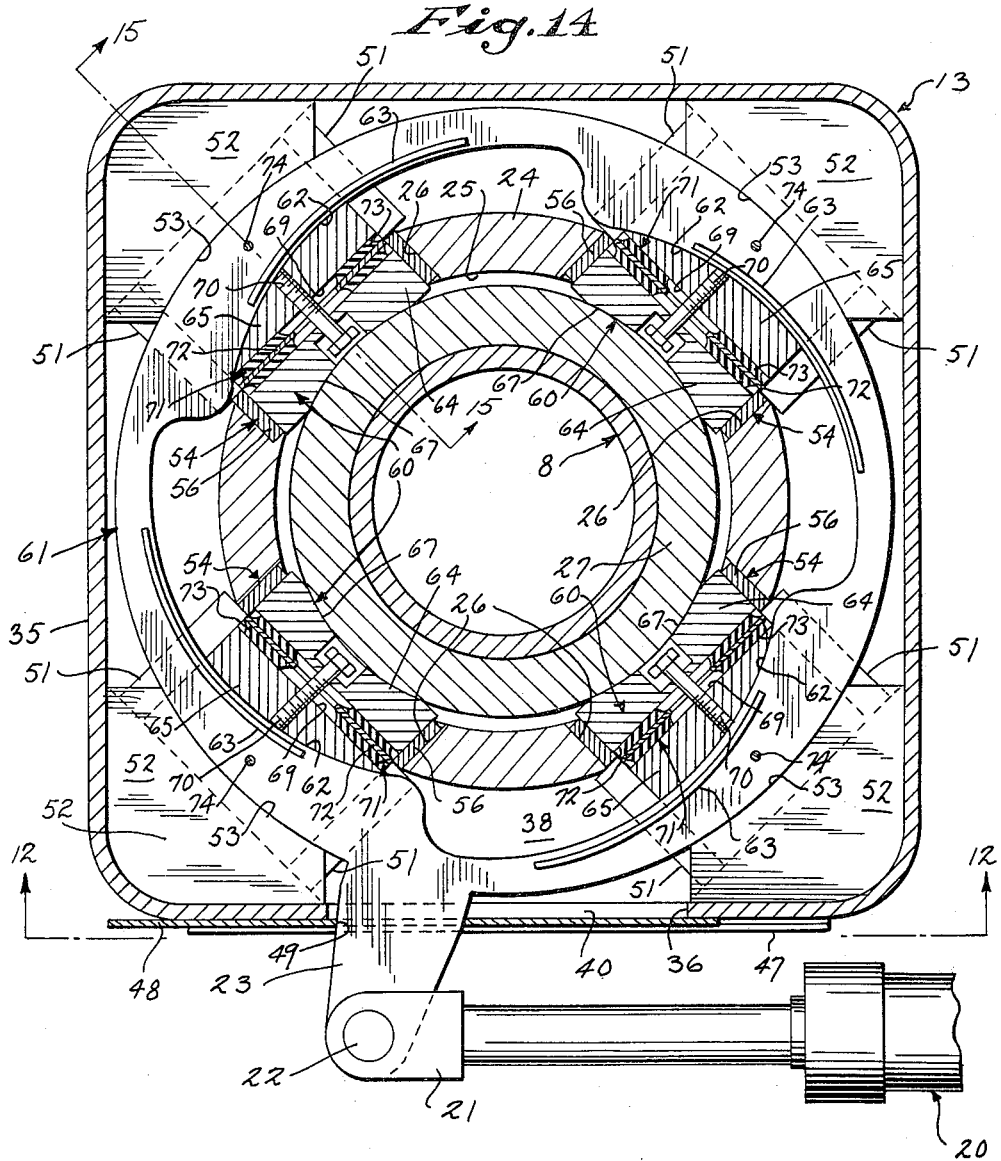
FIG. 14 is a view in cross section through the plane 14—14 shown in FIG. 12, a portion of an actuating cylinder also being shown.
Figure 15:
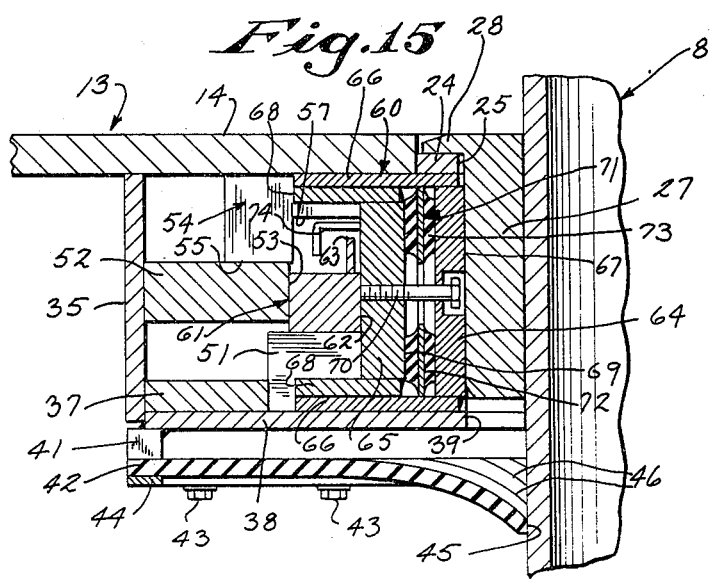
FIG. 15 is a fragmentary view in cross section through the plane 15—15 shown in FIG. 14.

As can be seen in FIGS. 7, 14 and 15, there are welded or otherwise affixed to the top surface of the plate 38 four pairs of parallel upstanding lower metal guide plates 51 which define parts of the side walls of channels that extend radially inwardly from the corners of the plate 38 and in which pads to be described can move radially. The upper surfaces of the plates 51 also serve as support and bearing surfaces for a cam ring to be described. Cam bearing plates 52 are welded to the interior surface of the wall 35 at all four corners above the plates 37, and these are provided with cylindrically concave inner faces 53. As can be seen in FIGS. 7 and 10, four pairs of upper metal guide plates 54 are welded to the bottom surface of the plate 14 and the side wall 35 and extend inwardly from the corners of the enclosure defined by the side wall 35. The facing vertical inner surfaces of the plates 54 are essentially in alignment with the corresponding facing inner vertical surfaces of the plates 51, the plates 51 and 54 together thus defining side walls for the pad channels. The plates 54 are essentially L-shaped with horizontal legs 55 that are fixed to and support the bearing plates 52 and vertical legs 56 that mate with and are fixed to respective side walls of the cutouts 26. Each plate is provided, in the leg 55, with a cutout 57 that provides clearance for retracting elements to be described.

Figure 9:
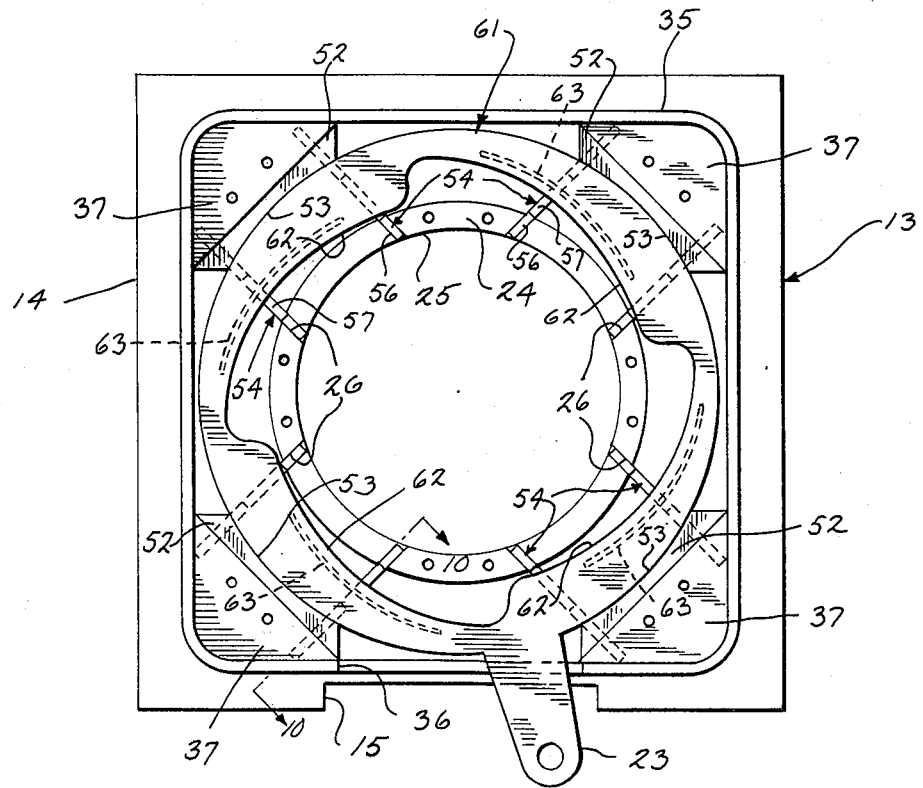
FIG. 9 is a bottom plan view similar to FIG. 8, but with the cam ring in place.

As can be seen most clearly from FIG. 7, there are disposed within the housing 13 four pad assemblies, indicated generally by the reference numeral 60, which are radially movable toward and away from respective corners of the side wall 35, the pads 60 being symmetrically placed about the bushing 27 to define two sets of diametrically opposite pads or pad assemblies. Movement of the pads 60 is effect by rotation of a cam ring 61 which is seen most clearly in FIG. 9. The radially outer edge of the cam ring 61 is circular, and it slidingly bears against the faces 53 of the bearing plates 52. As seen in FIG. 9, the cam ring 61 has been rotated to the full extent of its travel in a counterclockwise direction, and this can be termed an actuated position. The ring 61 can be rotated from this position in a clockwise fashion toward what can be termed a retracted position. The radially inner edge of the cam ring 61 is shaped to define four identical, symmetrically distributed lobes or camming surfaces 62, there being one surface 62 for each pad 60. On the upper horizontal surface of the cam ring there are four upstanding retraction ridges 63, each ridge 63 being parallel to and etending along a substantial portion of the length of its associated camming surface 62 and being slightly outwardly radially spaced therefrom. As can be seen in FIG. 15, when the cam ring 61 is in place it rests on and slides along the upper surfaces of the lower guide plates 51, and the ridges 63 are in the area of the cutouts 57.

The construction of the pads 60 is seen most clearly in FIGS. 14 and 15. All of the pad 60 are identical, and each comprises, in essence, two U-shaped metal sections, one nested in the other, with their closed ends facing radially inwardly and their open ends facing outwardly. In the drawings, the two nested sections are shown as being fabricated from separate pieces of metal, but they could obviously be formed from a single piece. The two sections of each pad 60 comprise a radially innermost bearing section 64 and a radially outermost backing section 65 nested therein. The bearing sections 64 each have upper and lower walls 66 that have essentially flat surfaces and an inner wall 67 the radially outermost surface of which is flat but the radially innermost surface of which is cylindrically concave to mate with the exterior surface of the bushing 27 that it bears on as seen in FIG. 14. The backing sections 65 each have flat upper and lower walls 68 that are between, face and are relatively closely spaced from the interior surfaces of the walls 66, and a front wall 69 the radially innermost surface of which is flat but the radially outermost surface of which is curved to mate with an associated camming surface 62.

It is important to note that the top plate 14, bottom plate 38, lower guide plates 51 and upper guide plates 54 together define four essentially completely enclosed channels which allow essentially only radial movement of the pads 60, the plates 14 and 38 being relatively closely spaced from and engageable with the walls 66 to limit vertical movement and the plates 51 and 54 being relatively closely spaced from and engageable with the edges of the sections 64 and 65, which edges are essentially in line, to limit lateral movement, or in other words rotational movement about the centerline of the drill string 8. These facing surfaces are all metal and can thus withstand the vertical and rotational forces transmitted through the bushing 27. There is of course some necessary clearance between the noted parts, but this is of no operational consequence.

The sections 64 and 65 are loosely secured together by means of bolts 70 which have their heads in recesses on the radially innermost surfaces of the walls 67 and extend loosely through openings formed therein and are threaded into tapped openings in the walls 69. Thus, the two sections 64 and 65 are held together but can have limited radial movement with respect to one another. The recesses in the radially innermost surfaces of the walls 67 are deep enough so that the heads of the bolts 70 do not protrude radially inwardly beyond the forward walls 67 even when the two sections have been moved together to the greatest selected degree. Interposed between the facing surfaces of the walls 67 and 69 are cushion members 71, which in the preferred embodiment are circular toroidal members that have central, washer-shaped reinforcing plates 72 to which rubber half-rings are suitably bonded on both sides, the bolts 70 extending through the open center portions of the cushions 71. As the sections 64 and 65 are moved toward one another, the cushions 71 are compressed, the amount of such movement determining the degree of compression and, therefore, the remaining resilience and allowed travel. While the cushions 71 are subject to compression by relative radial movement of the sections 64 and 65, the aforesaid channels and the fact that the sections 65 are nested in the sections 64 with the walls 68 facing the walls 66 together allow the two sections to move essentially only radially with respect to one another, apart from the slight movement allowed by necessary clearances. Accordingly, the cushions 71 are not subject to any substantial vertical or rotational forces, and the wear and damage that might result therefrom. It is also important to note that it is the metal walls 67 that bear against the bushing 27, this serving to protect and lengthen the useful life of the cushions.

As previously indicated, the drawings shown the mounting arrangement in a fully actuated position, wherein the cushions 71 are compressed to the greatest degree possible within the designed operating range. That is, referring to FIG. 14, the cam ring 61 has been rotated as far as possible in a clockwise direction. The front walls 67 of the bearing sections 64 are against the exterior surface of the bushing 27 and the cam surfaces 62 have moved the backing sections 65 radially inwardly as far as possible within the selected range, thus compressing the cushions 71 to the greatest degree within the selected operating range. In this position, the bushing 27 is held quite tightly, or in other words has a maximum resilient preload, but there is substantial resilience remaining in the cushions 71 in this position so that vibrations transmitted to the bushing 27 from the drill string 8 can be damped and taken up; vibrations will cause lateral movement of the bushing 27 in the opening 25, which will in turn cause it to push against one or more surfaces 67 and compress the associated cushion 71, such compression serving to compensate for and dampen the vibratory movement. If desired, the cam ring can be rotated in a counterclockwise direction as seen in FIG. 14 by retracting the rod of the actuating cylinder 20, and this will relieve the compression of the cushions 71 proportional to the amount of rotation; this allows the resilient loading on the bushing 27 to be ajdusted to meet particular operating conditions. When it is desired to fully retract the pads 60, for example when the bushing 27 is to be removed as the result of pulling up the drill string 8 to move the machine, the ring 61 is rotated in a counterclockwise direction as seen in FIG. 14 for the full length of its travel, and to insure retraction of the pads 60 there are L-shaped pins 74 fixed to the radially outermost surfaces of the walls 69 and these catch behind the ridges 63 and ride along them to move the pads 60 backwardly, the bolts 70 serving to retract the sections 64. It should be noted that the arcs of the camming surfaces 62 are not and cannot be concentric about the center of the housing, as the result of which the radially outermost surfaces of the walls 69 cannot mate with the surfaces 62 throughout the whole travel of the ring 61; that is, as the ring 61 is rotated in a counterclockwise direction as seen in FIG. 14 the right hand or thicker edge of each wall 69 will begin to be separated from the cam surface 62. It is necessary to compromise in the design of these surfaces, and it is preferable to have them mate exactly in the fully compressed position shown in FIG. 14.

Experience to date has indicated that a substantial preload is desirable in many situations; one advantage of a high preload is that it helps to insure that the bushing is kept centered. While it is impossible to predetermine suitable preloads for all cases, it has been found that lateral forces exerted by the drill string in the machine for which this embodiment was designed are in the neighborhood of 25,000 lb., and preloads of 10,000 to 20,000 lbs. with a bushing travel range of about one inch seem most effective. It may, however, be desirable in some cases to have less preload, or even preloads so light that the bushing 27 can rotate with the drill string 8 —this would of course require removal of the lugs — and 31. One advantage of allowing the bushing 27 to rotate would be that wear would be between the exterior surface of the bushing and the surfaces 67 and would not affect the clearance between the bushing and drill string, which should be kept small.

The preferred embodiment of the invention shown and described herein accomplishes and provides the various noted objects and advantages. It will be apparent, however, that modifications might be made without departure from the spirit of the invention. As previously indicated, for example, it is not necessary that the mounting elements be disposed in a separate housing. Adjustment means other than the cam ring 61 might be used to effect movement and resilient preloading of the pads 60. Means other than the toroidal members 71, such as compression springs, could be used as resilient cushions, and with some possible constructions the cam or other actuating means might bear directly on the resilient cushions without the interposition of outer backing sections like the sections 65; it is of course necessary that there be some fixed backup means radially outward of the cushions to effect the desired compression upon lateral movement of the bushing. It is not imperative to have four pads 60; this provides equal and opposite actions and appears to be best with high preloads, but three, five or more pads could be used. The pads should, however, be symmetrically placed about the bushing to share loads equally. The bushing need not be a single piece and could be segmented; such a construction would still constitute a "rigid" bushing in the context of the invention. If desired, the bushing could be disposed in a secondary box or collar surrounding it - the pads would then actually bear on the surrounding member but would effectively be bearing against the bushing - but this would result in extra weight that would move against the pads and care would have to be taken to avoid force amplifying effects. In view of the foregoing and other possible modifications, the invention is not intended to be limited by the showing or description herein, or in any other manner, except insofar as may specifically be required.

We claim:

1. A mounting arrangement for the rigid tubular cylindrical guide bushing of a blast hole drill or the like, the bushing being disposed and laterally movable in a deck opening, said mounting arrangement comprising:

a plurality of pads symmetrically spaced about the bushing, each pad including a radially inner rigid bearing member that bears against the side exterior surface of the bushing; a plurality of resilient, compressible cushion members, one cushion member being disposed adjacent and radially outwardly of each of said bearing members; and backup means adjacent and radially outward of the cushion members, lateral movement of the bushing against the bearing members causing the same to be moved radially outwardly to compress the respective cushion members, thus dampening such lateral movement.

2. A mounting arrangement according to claim 1, including adjustment means disposed radially outwardly of the cushion members and operable to compressively preload the same to a selected degree.

3. A mounting arrangement according to claim 2, wherein: each pad includes a rigid, radially movable backing section adjacent and radially outward of the associated cushion; and the adjustment means comprises a rotatable cam ring that surrounds the several backing sections and that has a plurality of identical radially inwardly facing cam surfaces, one cam surface being engageable with each backing section, rotation of the cam ring in an actuating direction causing all of the backing sections to be moved radially inwardly to preload all of the cushions to the same degree.

4. A mounting arrangement according to claim 2 wherein: each pad comprises a radially inner bearing section and a radially outer backing section, each of said sections being U-shaped with upper and lower walls and radially inwardly facing closed ends; and the backing section of each pad is nested in the inner section and is relatively radially slidable with respect thereto; and the cushion members are disposed between the closed ends of the sections; and the adjustment means acts on the backing sections.

5. A mounting arrangement according to claim 4, wherein: the upper and lower walls of the backing sections face and are relatively closely spaced from respective upper and lower walls of the bearing sections; and there are a plurality of channels with top and bottom walls facing and relatively closely spaced from the upper and lower walls of the bearing sections and side walls facing and relatively closely spaced from the edges of the pad sections, the pad sections thus being substantially held against all but radial movement relative to the bushing and to one another.

6. A mounting arrangement according to claim 5, wherein: the adjustment means comprises a rotatable cam ring that surrounds the backing sections and lies between their upper and lower walls, the cam ring having a plurality of identical radially inwardly facing cam surfaces, one for each pad, each cam surface being adjacent to the radially outermost surface of the closed end of the backing section of the associated pad, rotation of the cam member causing all of the backing sections to be moved radially inwardly so that all the cushions are preloaded to the same degree.

7. A mounting arrangement according to claim 6, wherein there are four pads symmetrically placed about the bushing.

8. A mounting arrangement according to claim 6, wherein: the bearing and backing sections of each pad are connected to allow only limited relative radial movement therebetween; and the cam ring includes a horizontal surface provided with upstanding ridges extending along and parallel to the cam surfaces; and the backing sections are provided with pins that hook radially rearwardly over the ridges to cause the backing sections to be retracted as the cam ring rotates toward a retracted position.

9. A mounting arrangement according to claim 6, wherein: the pads and cam ring are enclosed in a housing provided with a sleeve that defines the deck opening that receives the bushing and that is provided with cutouts through which the bearing sections of the pad extend; and the housing has top and bottom walls, a perimetral side wall, and a plurality of spaced parallel pairs of radially inwardly extending guide plates, the housing top and bottom walls and the guide plates together defining the channels for the pads; and there is an actuating arm extending radially from the cam ring; and the side wall defines a slot through which the arm extends, said slot being elongated to provide a range of travel for the arm.

* * * * *